Patented Aug. 9, 1938

2,126,028

UNITED STATES PATENT OFFICE 2,126,028

SAFETY GLASS

Howard K. Nason, St. Louis, Mo., assignor to Monsanto Chemical Company, St. Louis, Mo., a corporation of Delaware No Drawing. Application October 11, 1937, Serial No. 168,397

4 Claims. (Cl. 49—81)

The present invention relates to laminated or safety glass and refers more particularly to a plastic composition for use as an interlayer in producing such safety glass.

It is an object of the present invention to provide improved reinforcing sheets or interlayers of tough non-brittle plastic material consisting predominantly of plasticized polyvinyl acetal resins for safety glass. It is a further object of the invention to provide a plasticizer for such resinous interlayers. These and other objects are attained in the invention, as will be apparent from the description which follows hereinafter.

The defects of safety glass are generally known. Nitrocellulose for a long time had been the only plastic material used as an interlayer in such materials but because of its darkening on exposure to light it has been gradually replaced by cellulose acetate and similar cellulose derivatives. Safety glass made with cellulose-organic-acid-ester interlayers has not been entirely satisfactory and, with the more general adoption of safety glass in replacing ordinary plate and window glass, it has become imperative to provide improved products of greater resistance to atmospheric influences. In the course of this continued improvement, the cellulose esters are being gradually superseded by the polyvinyl acetal resins as interlayers.

The polyvinyl acetal resins are those which result from the condensation with aldehydes of partially hydrolyzed vinyl ester polymers. Such resins are sold under various trade names, for example, a resin resulting from the condensation with formaldehyde of a polyvinyl ester hydrolysis product is known as "Formvar". A similar condensation product of a polyvinyl ester hydrolysis product with butyraldehyde is called "Butvar". These resins, in comparison with cellulose derivatives, are characterized by increased toughness and greater resistance to discoloration by light.

The polyvinyl acetal resins for use as interlayers in safety glass are improved to a great extent by the incorporation of plasticizers therewith. Plasticizers increase the flexibility of the resin and permit greater ease in handling and fabrication of safety glass. Furthermore, some plasticizers have to a remarkable extent the property of imparting to the resin sheet an increased flexibility at low temperatures, as a result of which safety glasses made therewith are less fragile at such low temperatures. The use of plasticizers in polyvinyl acetal resins, although desirable, has been attended to a great extent with a sacrifice of the inherently desirable characteristics of the resinous interlayer, for example, characteristics such as the light stability, toughness and moisture-resistance.

Although numerous plasticizers are available for cellulose derivatives and vinyl resins, their use in polyvinyl acetal resins for use as safety glass interlayers has for one reason or another proved entirely undesirable. Not only is it not possible to predict the behavior of a well-established cellulose plasticizer in polyvinyl acetal films but it is furthermore impossible to anticipate the properties of the resulting safety glass. Dibutyl phthalate and tricresyl phosphate are the substances used in greatest volume in the industry as plasticizers for cellulose nitrate; dimethyl phthalate and triphenyl phosphate are the two used as plasticizers for cellulose acetate in greatest volume. These substances cannot be used as plasticizers for polyvinyl acetal resins with any degree of success. Dibutyl phthalate, triphenyl phosphate and tricresyl phosphate are not compatible with polyvinyl acetal resins and retentive therewith to a degree sufficient to produce any outstanding improvement in the flexibility of polyvinyl acetal resin films at low temperatures. Dimethyl phthalate is compatible in almost all proportions with polyvinyl acetal resins. When incorporated with such resins in proportions sufficient to produce an increased flexibility at low temperatures, however, films result which are soft and tacky. Such films cannot be used for other reasons, for example, because of the volatility of dimethyl phthalate and its consequent loss from the film; and because of the water solubility of the dimethyl phthalate, to which is probably ascribable the undesirable blushing of polyvinyl acetal films plasticized therewith on contact with moisture.

The present invention is based upon my unexpected discovery that trialkyl citrates can be incorporated as plasticizers in polyvinyl acetal films and that such films are improved in flexibility and other characteristics without any sacrifice of the other desirable characteristics of polyvinyl acetal films for use as interlayers in safety glass. The especially desirable attributes of the safety glass made according to my invention are more fully described hereinafter.

In a typical method for the production of safety glass plastic interlayers according to the process of my invention, approximately 100 parts of a polyvinyl acetal resin such as the product known as "Butvar", resulting from the condensation with butyraldehyde of the partial hydrolysis product of a polyvinyl ester, are incorporated with an alkyl citrate, preferably by mixing with slight warming in a mixing machine or by incorporation with acetone or a similar mutual solvent for the resin and citrate ester. The resinous composition is then sheeted in a suitable manner, for example, extrusion under pressure, and the sheets are pressed between glass plates under pressure, advantageously with the application of heat. Usually adhesives to bond the sheets and glass plates are not necessary with polyvinyl acetal interlayers when the pressing is accomplished under heat and pressure since the resin and glass become strongly adherent, but they may be used if desired. The glass plates are thereafter cut to size and finished in the usual manner.

The alkyl citrates contemplated for use in the invention are those resulting from esterification of citric acid with alcohols containing three or more carbon atoms, for example, tripropyl citrate, tributyl citrate, trihexyl citrate, etc. These esters may be derived from either primary or secondary alcohols, although I prefer normal primary alcohol esters. Esters derived from glycol and glycerol ethers containing one or more unetherified hydroxyl groups are also suitable plasticizers of similar characteristics. The lower esters such as triethyl and trimethyl citrate possess solubilities in water that are too high to permit their use in polyvinyl acetal interlayers for safety glass, particularly safety glass that does not have sealed edges. In this regard it is to be noted that the usual practice does not permit the sealing of the edges of safety glass made with polyvinyl acetal resin interlayers, such as is customary with safety glass containing cellulose ester interlayers.

The proportion of plasticizer incorporated with the polyvinyl acetal resin may be varied depending upon the characteristics desired in the film. Proportions of 50 parts of tributyl citrate to 100 parts of Butvar and even greater proportions of this citrate ester are freely compatible but the limits of compatibility will differ to some degree with the various plasticizers and resins comprehended in the invention.

The film produced by incorporating 50 parts of tributyl citrate and 100 parts of Butvar resin is clear and moderately soft but is not tacky and exhibits the rubbery properties which are so eagerly sought in interlayer plastics for safety glass. Furthermore, the plasticizers in such films are less fugitive than other known materials of this class. In comparison with films of this resin plasticized with equal quantities by weight of other plasticizers, the tributyl-citrate-plasticized resin film is outstanding in that it shows the least plasticizer loss when such films are left in an oven at 105° C. The respective plasticizer losses at this temperature after various periods were as indicated in the table:

*Butvar films plasticized with various plasticizers*

| Plasticizer (50 parts per 100 parts resin) | Per cent plasticizer loss at 105° C. after— | | | |
|---|---|---|---|---|
| | 24 hours | 48 hours | 72 hours | 96 hours |
| Dibutyl phthalate | 29.8 | 51.7 | 67.5 | 77.9 |
| Dibutyl sebacate | 10.6 | 17.8 | 25.3 | 32.7 |
| Triglycol dihexoate | 16.0 | 26.6 | 34.9 | 41.2 |
| Tributyl citrate | 7.8 | 12.8 | 19.2 | 24.6 |

For the production of safety glass interlayers the plasticizers of the invention may be incorporated with other plasticizers in known manner and with other constituents of a secondary nature such as stabilizers and the like.

Inasmuch as the specification comprises preferred embodiments of the invention it is to be understood that the invention is not limited thereto and that changes and modifications may be made therein without departing substantially from the invention, which is defined in the appended claims.

What I claim is:

1. Safety glass including in combination a plurality of sheets of glass bonded together through the medium of a layer of a resinous polyvinyl acetal in admixture with a plasticizer consisting of an alkyl ester of citric acid in which the alkyl group contains at least three carbon atoms.

2. Safety glass including in combination a plurality of sheets of glass bonded together through the medium of a layer of resinous polyvinyl acetal in admixture with a plasticizer consisting of tributyl citrate.

3. Safety glass including in combination a plurality of sheets of glass bonded together through the medium of a layer of a resinous product resulting from the condensation of butyraldehyde with a partially hydrolyzed polyvinyl ester in admixture with a plasticizer consisting of an alkyl ester of citric acid in which the alkyl group contains at least three carbon atoms.

4. Safety glass including in combination a plurality of sheets of glass bonded together through the medium of a layer of a resinous product resulting from the condensation of formaldehyde with a partially hydrolyzed polyvinyl ester in admixture with a plasticizer consisting of tributyl citrate.

HOWARD K. NASON.